United States Patent [19]

Atwood et al.

[11] 3,904,735

[45] Sept. 9, 1975

[54] PROCESS FOR THE SELECTIVE REMOVAL OF SULFUR DIOXIDE FROM EFFLUENT GASES

[75] Inventors: Gilbert R. Atwood, Briarcliff Manor; Robert J. Blake, Yorktown Heights; Kenneth F. Butwell, Newburgh; David A. Dunnery, New York, all of N.Y.

[73] Assignee: Union Carbide Corporation, New York, N.Y.

[22] Filed: Jan. 12, 1973

[21] Appl. No.: 322,985

Related U.S. Application Data

[63] Continuation-in-part of Ser. No. 232,585, March 7, 1972, abandoned.

[52] U.S. Cl. ............................ 423/243; 423/235
[51] Int. Cl. ............................ C01b 17/00
[58] Field of Search ............................ 423/242–244, 423/235

[56] References Cited

UNITED STATES PATENTS

| 2,106,446 | 1/1938 | Baehr et al. .................. 423/243 X |
| 3,047,364 | 7/1962 | Vian-Ortuno .................. 423/539 |
| 3,658,462 | 3/1970 | Van Scoy ...................... 423/243 |
| R18,958 | 9/1933 | Bottoms ........................ 423/243 X |

FOREIGN PATENTS OR APPLICATIONS

| 443,314 | 2/1936 | United Kingdom ............... 423/243 |

*Primary Examiner*—Oscar R. Vertiz
*Assistant Examiner*—Gregory A. Heller
*Attorney, Agent, or Firm*—S. R. Bresch

[57] ABSTRACT

Method for scrubbing $SO_2$ and mixtures of $SO_2$ and $SO_3$ from effluent gases using aqueous trialkanolamines or tetrahydroxyalkyl alkylene diamines or the corresponding amine and diamine sulfites as the absorbent solvent composition has been developed. The method can be used even where the effluent gases contain a preponderance of $CO_2$.

12 Claims, 1 Drawing Figure

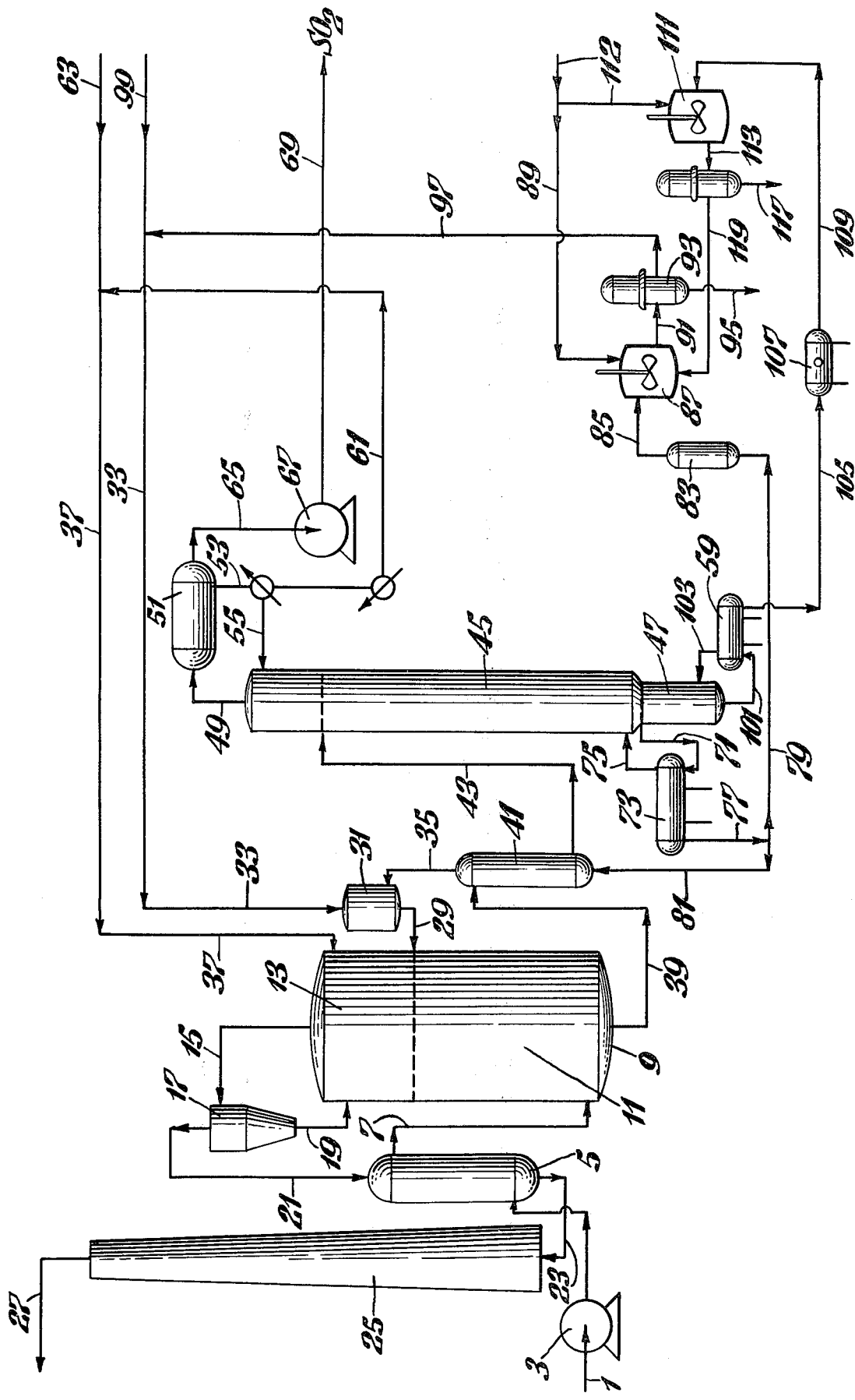

PROCESS FOR THE SELECTIVE REMOVAL OF SULFUR DIOXIDE FROM EFFLUENT GASES

This is a continuation-in-part of Ser. No. 232,585 filed Mar. 7, 1972.

BACKGROUND OF THE INVENTION

This invention relates to a process for the removal of sulfur dioxide and mixtures of sulfur dioxide and sulfur trioxide from effluent gases and more particularly to a process wherein the effluent gases contain a preponderance of carbon dioxide and the absorption of carbon dioxide from these effluent gases is kept to a minimum.

The use of sulfur-containing fossil fuels as power sources results in effluent gases containing a number of noxious environmental pollutants, chief among which are sulfur dioxide and sulfur trioxide. A number of solutions to this problem has been proposed which involved absorbing and/or reacting the sulfur oxides with inorganic reagents, e.g., sodium carbonate, in solution, slurry, or powder to yield the corresponding sulfite and sulfate salts. Gas treating systems which utilize reagents in quantitative amounts, however, are quite expensive, not only in the cost of the reagent itself but in the high transportation costs required for continually bringing the reagent to the plant site and removing the salts formed.

A process for the selective removal of $SO_2$ and $SO_3$ from effluent gases utilizing an absorbent solvent which can be regenerated offers significant advantages economically over processes necessitating the use of a quantitative amount of reagent which cannot be regenerated. Solvents, such as monoethanolamine, used to scrub carbon dioxide and hydrogen sulfide from natural gas streams and carbon dioxide from streams of hydrogen and nitrogen in hydrogen and ammonia plants, are not satisfactory for selective treatment of flue gases. Here one requires a solvent which selectively will absorb $SO_2$ and $SO_3$ readily without absorbing appreciable quantities of carbon dioxide. Flue gases commonly contain about 15 weight % of carbon dioxide which is approximately 50 to 100 times the concentration of $SO_2$ therein. Since the gas which is not to be absorbed is present in much higher ratios than the gas or gases which are to be removed, the problem is greatly magnified.

Even in the treatment of effluent gases from sulfuric acid plants which in the case of chamber process plants contain mainly $NO_2$ (1000 ppm) and NO (500 ppm) together with $SO_2$ (1500 to 4000 ppm) in the effluent or in the case of contact plants which contain $SO_2$ (3000 to 5000 ppm), $SO_3$ (0.3 to 1.3 ppm) oxygen (9 to 11% by volume) and the remainder inert gases which include $N_2$, A and $CO_2$, prior art disclosures relating to the feasibility of using organic absorbents, particularly amines, for the absorption of $SO_2$ have been unsatisfactory. It has been reported that amines in general absorb $SO_2$ from gases containing it by an irreversible, disproportionation reaction, which produces dithionates, thus making solvent regeneration by thermal stripping impossible. Further, it has been found that at temperatures above about 100°C., irreversible reactions occur with amine solvents producing organic sulfur compounds and polymeric products.

These studies have also shown that the evaporative loss of organic solvent, even for solvents with low volatility, is high because of the high gas flow to liquid flow ratio.

Another difficulty resides in the fact that an autocatalytic oxidation of $SO_2$ to $SO_3$ in organic solvent systems takes place because of the oxygen present in the flue gases. The $SO_3$ is not normally strippable from the solvent and results in loss of solvent absorbent capacity as it accumulates.

The solution to this problem of selectively removing $SO_2$ or $SO_2$ and $SO_3$ from effluent gases without removing appreciable amounts of carbon dioxide requires not only a chemical choice of the solvent or solvents to be used, but also the proper choice of solvent reclamation procedures, as well as a careful delineation of the physical arrangement, steps and equipment or hardware required for use therewith.

SUMMARY OF THE INVENTION

It has now been found that sulfur dioxide can be selectively removed from gas mixtures by a process which consists essentially of the steps of:

1. passing said gas mixture at a temperature below 100°C. through an absorber in counter current contact with an absorbent solvent composition consisting essentially of:
   a. from about 50 to about 95% by weight of at least one nitrogen-containing compound selected from compounds having the formula:

I 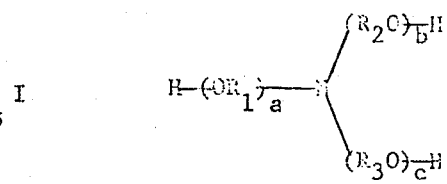

wherein each of $R_1$, $R_2$ and $R_3$ is an alkylene group having from 2 to 4 carbon atoms and each of $a$, $b$ and $c$ is an integer having values of 1 to about 5; or II 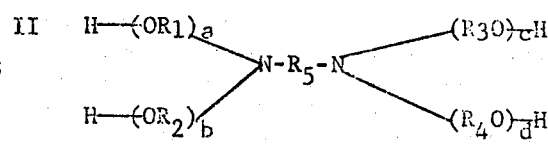

wherein each of $R_1$, $R_2$, $R_3$ and $R_4$ is an alkylene group having from 2 to 4 carbon atoms, each of $a$, $b$, $c$ and $d$ is an integer having values of 1 to about 5 and $R_5$ is an alkylene group having from 1 to about 6 carbon atoms; and b. at least about 5% water, at a solvent composition flow to gas flow ratio such that the molar concentration of sulfur dioxide to be absorbed therein does not exceed the molar concentration of water present;

2. absorbing sulfur dioxide in said solvent composition;

3. passing the absorbent solvent composition containing absorbed sulfur dioxide at a maximum temperature of about 115°C. to at least one stripping tower and stripping absorbed sulfur dioxide while maintaining the temperature in the stripper such that the stripped absorbent solvent composition bottoms emerging from the stripper does not exceed about 125°C.;

4. removing from the stripper a stripped lean solvent bottoms composition containing a maximum of about 20% by weight of sulfur dioxide and at least about 1 mol of water for each mol of sulfur dioxide remaining in said lean solvent;

5. recycling the stripped lean solvent bottoms from step (4) to the absorber together with sufficient water to provide a solvent absorbent composition having the same composition as that of step 1 (a) and (b); and 6. removing from the stripper a vapor consisting essentially of sulfur dioxide and water.

When the effluent gas stream to be treated by the process of this invention also contains sulfur trioxide in addition to sulfur dioxide or if sulfur trioxide is produced during treatment by oxidation of sulfur dioxide (even with $CO_2$ still in preponderance in relation to these two gases), the absorbent solvent composition when used in the practice of this invention will quantitatively absorb the sulfur trioxide. The sulfur trioxide can be removed from the absorbent solvent composition by isolating from the system a portion of the lean absorbent solvent stream removed from the stripper, said portion either being chemically reclaimed or discarded and replaced in the total system by fresh or reclaimed absorbent solvent composition. The isolated portion of the lean solvent absorbent can be reclaimed by the addition of a stoichiometric quantity of potassium ion, preferably introduced to the system as potassium hydroxide or potassium carbonate. This treatment with potassium ion results quite unexpectedly in a quantitative precipitation of potassium sulfate, said precipitate thereafter being removed from the liquor by conventional means such as filtration, centrifugation and the like, with the reclaimed absorbent solvent being returned to the absorption process system.

When treating effluent gases containing nitrogen oxides in addition to sulfur dioxide or a mixture of sulfur dioxide and sulfur trioxide, a portion of these nitrogen oxides may be absorbed in the absorbent solvent composition described above and then ejected therefrom with sulfur dioxide in the stripping step. Small amounts may be retained in the form of amine nitrates and/or nitrites in said absorbent solvent. The concentration of these nitrates and/or nitrites can be kept at low concentrations in a flue gas treating system by isolating a portion of the lean solvent absorbent stream and discarding it, or removed from the system, by chemically reclaiming the absorbent solvent. The chemical reclamation of the lean absorbent solvent can be effected by addition of potassium ion preferably in the form of potassium hydroxide in an excess amount over that stoichiometrically necessary to precipitate all of the nitrate and nitrites as potassium salts as well as to precipitate all of the sulfur dioxide and sulfur trioxide if present as potassium sulfite and potassium sulfate respectively. These precipitates can be removed from the absorbent solvent liquor by conventional means such as filtration or centrifugation and the filtrate consisting of absorbent solvent returned to the system and used to provide potassium ion for the precipitation of sulfur trioxide as potassium sulfate as described supra.

DESCRIPTION OF THE INVENTION

The instant invention is delineated in the Figure which is a flow chart of the steps involved. Gas stream 1 containing sulfur dioxide, sulfur trioxide and carbon dioxide in proportions conventionally found in power plant flue gases or other effluent gases as for example sulfuric acid plant tail gases, and from which most of the fly ash has been removed, which under normal operating conditions would issue from the economizer at a temperature of about 150°C., is then forced by blower 3 through heat exchanger 5 where the gas mixture is cooled to a temperature between about 30° and about 100°C. (preferably between about 40° and 60°C.). The cooled gas 7 emerging from the side of the heat exchanger 5 is then passed into the bottom of the absorber 9. The absorber may consist of a lower section 11 comprising any of a number of standard types of absorption equipment (e.g., sieve trays, packed columns, spray towers, centrifugal absorbers and the like) and an upper water-wash section 13, the latter being used to remove entrained/or vaporized solvent. The absorption section 11 is equivalent to about 4 or about 5 theoretical stages while the water-wash section 13 is equivalent to about one theoretical stage. During the passage of the flue gas through the absorber, water will be removed from the absorption and water-wash sections, lowering the gas temperature to about 30° to about 50°C.

The gas stream 15 emerging from the top of the absorber 9 is passed into a de-mister 17 to remove entrained moisture which is recycled from the bottom of de-mister 17 as stream 19 back to water-wash section 13. The gas stream 21 emerging from the top of the de-mister passes into the top of heat exchanger 5 where it is heated to a temperature of about 90° to 140°C. and emerges from the bottom of heat exchanger 5 as gas stream 23 and vents through stack 25 as effluent stream 27.

The solvent stream 29 used to charge and replenish absorption section 11 of absorber 9 is fed from reservoir 31 which in turn is supplied from fresh solvent stream 33 and recycled solvent stream 35. Solvent stream 29, once the complete system has been in operation for a cycle or two, consists essentially of a solution of about 70 to about 95 weight % solvent (preferably about 85%), about 1 to about 20 weight % water (preferably about 10%), up to about 15 weight % residual absorbed sulfur dioxide (preferably about 2 to about 10%) and up to about 10 weight % sulfur trioxide (preferably less than about 5%). The solvent stream 29 is led to the absorption section 11 at a solvent to gas rate (weight of solvent/weight of gas) of about 0.005 to about 0.2 with a preferred ratio being about 0.01 to about 0.4 for a stack gas containing about 0.4 weight per cent sulfur dioxide. This solvent 29 passes downwardly in a countercurrent manner relative to the gas stream 7 and in so doing, absorbs most of the sulfur dioxide and sulfur trioxide in the gas stream, in addition to a small amount of carbon dioxide and traces of nitrogen oxide gases if they should be present in the stack gas.

The wash section 13 of absorber 9 is continuously fed a water stream 37 for the purpose of washing entrained or vaporized solvent from the gas stream. This water stream 37 is introduced at a rate of about 0.1 to 1.5 times that of the solvent stream 29 with the preferred rate being about 0.3 to about 0.8 times the solvent rate. Some of the water in the wash section 13 evaporates into the gas stream 15, the amount depending upon the initial water content of the flue gas passing from absorption section 11 into wash section 13 and the temperature in the absorber 11. The remaining water joins the solvent stream 29 in the absorber 11 and from this mixture additional water is evaporated by the gas stream passing through the absorbing section 11 depending upon the water content of the initial flue gas 1.

The rich solvent stream 39 issuing from the bottom of the absorber 9 consists essentially of about 50 to about 90 weight per cent solvent, about 5 to 30 weight per cent water about 10 to about 25 weight per cent sulfur dioxide, up to about 10 weight per cent sulfur trioxide, up to about 1 per cent carbon dioxide and traces of nitrogen oxide if they were initially present in the stack gas. When the solvent is triethanolamine and the water flow rates are indicated above, the rich solvent stream will contain about 60 to about 80 weight per cent triethanolamine, about 10 to about 15 weight per cent water, about 12 to about 25 weight per cent sulfur dioxide, about 1 to about 5 weight per cent sulfur trioxide and up to about 0.6 weight per cent carbon dioxide.

The rich solvent stream 39 is passed through heat exchanger 41 where it is heated to a temperature of about 80° to about 120°C. (preferably about 90°C.) and emerges as stream 43 from whence it proceeds into stripper 45.

Stripper 45 can be constructed from any number of designs of distillation tower (e.g., sieve tray, packed, or spinning band), with an equivalent of about 5 to about 20 theoretical stages, about 8 to about 12 being preferred, the actual number being dependent upon the exact solvent used and the desired degree of sulfur dioxide removal from the rich solvent stream 43. The greater the removal of sulfur dioxide at this stage (i.e., the less sulfur dioxide that will be in the lean solvent 35 recycled to reservoir 31), the less sulfur dioxide there will be in the stack effluent 27. The stripper 45 can be operated at atmospheric pressure but it is preferable to operate it at reduced pressure (i.e., about 2 to about 10 pounds per square inch). There may be, if desired, a small section 47 at the bottom of the stripper 45 for the very high stripping (that is, to sulfur dioxide contents much less than that normally present in the lean solvent 35). However, it should be recognized that this section 47 need not necessarily be part of the main stripper 45 but can be operated as a separate unit. Indeed it can be eliminated altogether if one does not object to a small loss of sulfur dioxide in the nitration precipitation step.

The overhead product from the stripper 45, stream 49, is cooled in condenser 51 and most of the water emerging as stream 53 is condensed out. A small portion of the stream 53 (about 1 to about 15 weight per cent) is diverted as stream 55 and led back into the top of stripper 45 in order to knock down entrained solvent and to provide additional steam if needed for sulfur dioxide stripping. The rest of the condensate from condenser 51, viz., stream 61 is combined with any needed makeup of water from stream 63 and recycled as stream 37 to the absorber 11 entering through the wash section 13. The uncondensed overhead 65 issuing from condenser 51 is passed through vacuum pump 67 as gaseous product sulfur dioxide 69 which may be dried, liquified and converted to end-products such as sulfuric acid, sulfur or disposed of as such.

The bottoms product 71 from the stripper 45 (taken above the high boiler stripping section 47) passes through reboiler 73 where a portion indicated by stream 75 is reboiled at a temperature between about 90° and 130°C. in order to reduce the sulfur dioxide content to a level of no greater than about 15 weight % and preferably about 2 to about 7 weight per cent. This reboiling may be carried out by indirect heating or by the introduction of live steam. The actual reboiling rate is approximately equal to that which the overhead product 49 is removed. The remainder of the reboiler stream 77 is split into two portions. The first portion stream 79, which constitutes about 5 to about 50 weight per cent of the reboiler product stream 77 and preferably about 5 to about 20 weight per cent, is withdrawn for reclamation of the solvent from the sulfur trioxide dissolved therein. The other portion of stream 77, viz., stream 81 is passed through heat exchanger 41 where it is cooled to the desired absorber temperature, i.e., about 30° to 80°C. and emerges as stream 35 passing into reservoir 31 for mixing with fresh solvent to provide make-up solvent for stream 29.

The reclamation stream 79 may contain up to about 10 weight percent sulfur trioxide (preferably about 2 to about 5 weight per cent sulfur trioxide), along with about 1 to about 10 weight per cent of water, up to about 15 weight per cent of sulfur dioxide (preferably about 2 to about 7 per cent of sulfur dioxide) up to about 5 per cent nitrate and/or nitrite (if there were nitrogen oxides in the flue gas), and some fly ash. Stream 79 passes through cooler 83 where it is cooled to about 20 to 60°C. and then passes as stream 85 into tank 87 where it is mixed with streams containing stoichiometric quantities of potassium ion sufficient to precipitate quantitatively all of the sulfur trioxide as potassium sulfate. The source of potassium ion added through stream 89 to tank 87 may be either aqueous potassium hydroxide or aqueous potassium carbonate. Precipitated potassium sulfate is removed as a slurry in stream 91 filtered in filter 93 to give a potassium sulfate cake 95 and a sulfate-free reclaimed solvent removed as stream 97 which can be recycled by joining fresh solvent stream 99 to form combined stream 33 which is used for recycle to reservoir 31. By using only stoichiometric quantities of potassium ion the cake of potassium sulfate 95 is obtained substantially free of potassium sulfite.

In nitrates and/or nitrites accumulate in the solvent, a small portion of the solvent, i.e., about 1 to about 10 weight per cent can be highly stripped in section 47 of the absorber 45 or in an external column. Steam is combined with stream 101 in reboiler 59 and the sulfur dioxide is steam stripped out emerging as stream 103 which is led back to section 47. The very lean solvent 105 is cooled to about 20° to about 60°C. in cooler 107 and then passed as stream 109 into tank 111 where it is combined with an excess of aqueous potassium hydroxide from stream 112 sufficient to precipitate all of the nitrate and/or nitrites present as potassium nitrate, and/or nitrite, all of the sulfur trioxide as potassium sulfate and all of the remaining sulfur dioxide as potassium sulfite. The resultant slurry 113 is taken from tank 111 and filtered in filter 115 from which is obtained filter cake 117 and liquor 119. The liquor stream 119 is led to tank 87 to provide some of the potassium ions for the sulfate reclaiming step.

It was unexpectedly found that in the precipitation steps only potassium ion can be used because if other alkali metal ions such as sodium are used, the precipitated sulfates, nitrates, or nitrites are not removed from the solvent completely, since they are not as insoluble in the solvent as the potassium salts therein. This was surprising since all of the members of the alkali metal group are usually considered to be equivalent in chemical and physical properties.

Another observation worthy of note is the fact that if the flue gas initially charged contains appreciable amounts of fly ash, it can accumulate in the solvent stream used to remove $SO_2$ and $SO_3$. Consequently filter cakes 117 and 95 will contain the fly ash in addition to the aforementioned salts and these reclamation steps serve thus to remove the fly ash as well as non-distillable sulfate and nitrate ions.

The preferred alkanolamine solvents used in the practice of this invention represented by formula I are triethanolamine and mixtures of alkanolamines represented by this formula in which triethanolamine constitutes at least 50 per cent of the mixture by weight. This preference for triethanolamine was predicated not only on its relatively low volatility, but by its observed high selectivity for $SO_2$ over $CO_2$, compared to dozens of similar solvents evaluated. Further, it was unexpectedly found that triethanolamine was one of the least active solvents in promoting the oxidation of $SO_2$ to $SO_3$; hence requiring the lowest degree of reclaiming. This oxidation rate varies by several orders of magnitude for various organic solvents, and for most is too high to permit their use in a practical process. It appears to be an inverse function of the number of hydroxyl groups on the solvent molecule. The use of triethanolamine as a solvent for this process, however, would be normally subject to the problems of $SO_2$ disproportionation and solvent degradation, had it not also been surprisingly discovered that these side reactions are very sensitive to temperature and water content. If the stripping temperature is kept below about 130°C., preferably below about 125°C., and if the water content is maintained at a level of at least one mole per mole of $SO_2$ and $SO_3$ present, then the side reactions are negligible. Hence the success of this process depends upon strict adherance to the suitable operating conditions as hereinabove described.

Other nitrogen-containing compounds used in this invention, in addition to triethanolamine, represented by Formula I supra include:
tri-n-propanolamine
  tri-isopropanolamine
tri-n-butanolamine
  tri-isobutanolamine
  tri-t-butanolamine
The above enumerated nitrogen-containing compounds are either commercially available or can be synthesized by the interaction of ammonia with the corresponding alkylene oxides, i.e., ethylene oxide, propylene oxide, butylene oxide and the like.

In addition to these nitrogen-containing compounds more complex compounds arising from the alkoxylation of the hydroxyl groups of the respective alcohol moieties of these compounds can also be used if desired. Such compounds are exemplified by the following formulae:

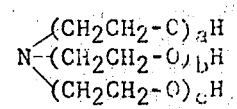 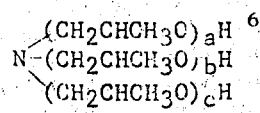 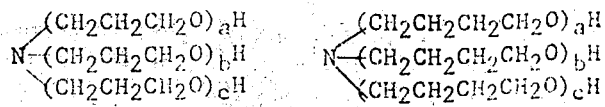

and the like, wherein each of $a$, $b$, and $c$ is an integer having values of 1 to about 5.

The preferred nitrogen-containing compound represented by Formula II supra is tetrahydroxyethyl ethylenediamine. Other compounds represented by Formula II include:
tetrahydroxyethyl methylenediamine
tetrahydroxyethyl-1,3-propylenediamine
tetrahydroxyethyl-1,2-propylenediamine
tetrahydroxyethyl-1,3-butylenediamine
tetrahydroxyethyl-1,4-butylenediamine
  tetrahydroxyethyl-1,5-pentylenediamine,
and the like.

As is the case with the nitrogen-containing compounds of Formula I, the compounds represented by Formula II can also be the alkoxylated derivatives of the above-enumerated diamines.

The other process limitations outlined above are equally critical. For example, if the gas mixture to be treated by the process of this invention is passed through the absorber at temperatures above about 100°C., there will not only be a low efficiency of absorption, but there will be a very rapid oxidation of $SO_2$ to $SO_3$, the latter of which will accumulate faster than it can be practically removed by precipitation.

Furthermore, if the absorbent solvent composition stream is passed to the stripping tower at a temperature above about 120°C., or if the stripping operation is operated at temperatures such that the temperature of the stripped bottoms emerging from the stripper exceeds about 125°C., there will occur side reactions of the $SO_2$, such as disproportionation, to yield dithionates or interactions with the solvent resulting in decomposition or the formation of polymeric products. These reactions are especially enhanced if the molar concentration of water falls below that of the $SO_2$ and/or $SO_3$ present.

If the lean absorbent solvent removed as stripper bottom contains less than about 1 mol of water for each mold of sulfur dioxide, or sulfur dioxide mixed with sulfur trioxide and/or nitrogen oxide then reactions in the stripper or its reboiler will lead to decomposition or polymerization of the solvent as well as disproportionation of the $SO_2$ to dithionates.

The limits of absorbent solvent compositions are critical too in that use use of compositions below about 50% by weight of nitrogen-containing compound results in the necessity of stripping out the excess water with its consequent higher heat requirement; while the use of compositions above about 95% by weight results in the aforementioned side reactions.

As an extension of the primary invention it has also been found that the nitrogen-containing compounds used as the absorbent solvents can be replaced by their corresponding sulfites. These sulfites can be prepared prior to their introduction into the absorption system or they can be prepared in situ as sulfur dioxide is absorbed by the nitrogen-containing compound by maintaining the lean absorbent solvent recycled as described above at a level of about 0.5 moles of sulfur dioxide per mole of nitrogen-containing compound. Thus in the case of the preferred nitrogen-containing compound, triethanolamine, the absorbent solvent would be ditriethanolamine sulfite. The generic formula for these sulfites corresponding to the Formula I nitrogen-containing compound described above would then be:

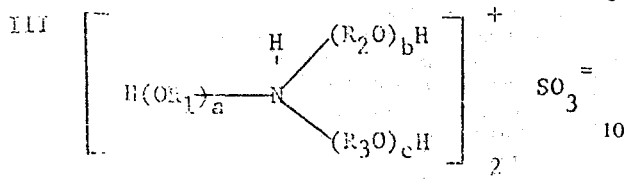

wherein each of $R_1$, $R_2$, and $R_3$ is an alkylene group having from 2 to 4 carbon atoms and each of $a$, $b$ and $c$ is an integer having values of 1 to about 5.

The generic formuls for the sulfite corresponding to Formula II nitrogen-containing compound described above is:

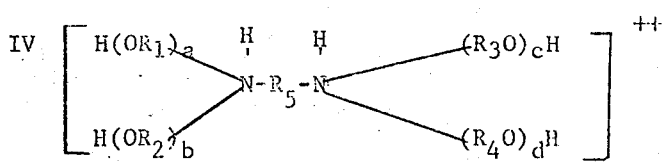

wherein each of $R_1$, $R_2$, $R_3$, and $R_4$ is an alkylene group having from 2 to 4 carbon atoms, $R_5$ is an alkylene having 1 to about 6 carbon atoms and each of $a$, $b$, $c$ and $d$ is an integer having values of 1 to about 5.

The preferred nitrogen-containing compound represented by Formula III is ditriethanolamine sulfite.

The preferred nitrogen-containing compound represented by Formula IV is tetrahydroxyethyl ethylenediamine sulfite.

Although the invention has been described in its preferred forms with a certain degree of particularity, it is understood that the present disclosure of the preferred forms has been made only by way of Example and that numerous changes may be resorted to without departing from the spirit and scope of the invention. For example, gas stream 1 could be cooled by a water quench instead of by heat exchange, as heretofore described, but the essential invention would not be changed.

What is claimed is:

1. A process for the selective removal of sulfur dioxide from gas mixtures which comprises:
   1. passing said gas mixture at a temperature below about 100°C. through an absorber in countercurrent contact with an absorbent solvent composition stream consisting essentially of:
      a. about 50 to about 95% by weight of at least one nitrogen-containing compound having the formula:

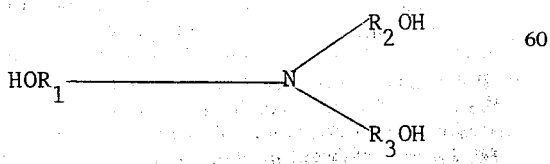

wherein each of $R_1$, $R_2$ and $R_3$ is an alkylene group having from 2 to 4 carbon atoms or the sulfite thereof, and
      b. at least about 5% by weight of water, a an absorbent solvent composition flow to gas flow ratio such that the molar concentration of sulfur dioxide to be absorbed therein does not exceed the molar concentration of water present;
   2. absorbing sulfur dioxide in said solvent composition;
   3. passing the absorbent solvent composition containing absorbed sulfur dioxide at a maximum temperature of about 115°C. to at least one stripping tower and stripping absorbed sulfur dioxide and water vapor from the solvent stream while maintaining the temperature in the stripper such that the temperature of the stripped lean solvent bottoms emerging from the stripper does not exceed about 125°C.;
   4. removing from the stripper stripped lean solvent bottoms containing a maximum of about 20% by weight of sulfur dioxide and at least about 1 mol of water for each mol of sulfur dioxide remaining in said lean absorbent solvent;
   5. recycling the stripped lean solvent bottoms from step (4) to the absorber together with sufficient water to provide an absorbent solvent composition having the same composition as that of step (1); and
   6. removing from the stripper a vapor consisting essentially of sulfur dioxide and water.

2. A process for the selective removal of sulfur dioxide and sulfur trioxide from gas mixtures which comprises:
   1. passing the gas mixture at a temperature below about 100°C. through an absorber in countercurrent contact with an absorbent solvent composition consisting essentially of:
      a. about 50 to about 95% by weight of at least one nitrogen-containing compound having the formula:

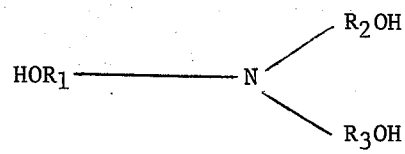

wherein each of $R_1$, $R_2$ and $R_3$ is an alkylene grouping having 2 to 4 carbon atoms or the sulfite thereof, and
      b. at least about 5% by weight of water, at an absorbent solvent composition flow to gas flow ratio such that the molar concentration of sulfur dioxide and sulfur trioxide absorbed in said absorbent solvent composition does not exceed the molar concentration of water present in the absorbent solvent;
   2. absorbing sulfur dioxide and sulfur trioxide in said solvent composition;
   3. passing the absorbent solvent composition containing absorbed sulfur dioxide and sulfur trioxide at a maximum temperature of about 115°C. to at least one stripping tower and stripping absorbed sulfur dioxide and water vapor from the absorbent solvent composition while maintaining the temperature in the stripper such that the temperature of the stripped lean solvent bottoms emerging from the stripper does not exceed about 125°C.;

4. removing from the stripper stripped lean solvent bottoms containing a maximum of about 20% by weight of sulfur dioxide and sulfur trioxide and at least about 1 mol of water for each mol of sulfur dioxide and sulfur trioxide absorbed in said lean absorbent solvent;

5. recycling one part of the stripped lean solvent bottoms from step (4) to the absorber together with sufficient water to provide an absorbent solvent composition having the same composition as that of step (1);

6. removing a second part of the lean absorbent solvent from step (4);

7. separating sulfur trioxide from the second part of lean absorbent solvent composition; and 8. recycling said absorbent solvent composition resulting from step (7) to the absorber in step (1).

3. Process for the selective removal of sulfur dioxide from a gas mixture containing sulfur dioxide and nitrogen oxide which comprises:

1. passing the gas mixture at a temperature below about 100°C. through an absorber in countercurrent contact with an absorbent solvent composition consisting essentially of:

a. about 50 to about 95% by weight of at least one nitrogen-containing compound having the formula:

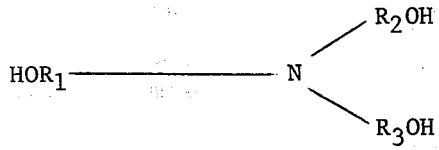

wherein each of $R_1$, $R_2$ and $R_3$ is an alkylene group having 2 to 4 carbon atoms or the sulfite thereof, and b. at least about 5% by weight of water, at an absorbent solvent composition flow to gas flow ratio such that the molar concentration of sulfur dioxide and nitrogen oxide absorbed therein does not exceed the molar concentration of water present in the absorbent solvent composition;

2. absorbing sulfur dioxide and nitrogen oxide in said solvent composition;

3. passing the absorbent solvent composition with absorbed sulfur dioxide and nitrogen oxide at a maximum temperature of about 115°C. to at least one stripping tower and stripping sulfur dioxide, water vapor, and nitrogen oxide from the absorbent solvent composition while maintaining the temperature in the stripper such that the stripped lean solvent bottoms emerging from the stripper does not exceed about 125°C.;

4. removing from the stripper a stripped lean solvent bottoms containing a maximum of about 20% by weight of sulfur dioxide and at least about 1 mol of water for each mol of sulfur dioxide and nitrogen oxide absorbed in said lean absorbent solvent; and 5. recycling the stripped lean solvent bottoms from step (4) to the absorber together with sufficient water to provide an absorbent solvent composition having the same composition as that of step (1).

4. A process for the selective removal of sulfur dioxide and sulfur trioxide from gas mixtures containing same and nitrogen oxide which comprises:

1. passing the gas mixture at a temperature below about 100°C. through an absorber in countercurrent contact with an absorbent solvent composition consisting essentially of:

a. about 50 to about 95% by weight of at least one nitrogen-containing compound having the formula:

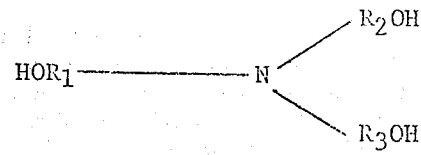

wherein each of $R_1$, $R_2$ and $R_3$ is an alkylene group having 2 to 4 carbon atoms or the sulfite thereof, and b. at least about 5% by weight of water, at an absorbent solvent composition flow to gas flow ratio such that the molar concentration of sulfur dioxide, sulfur trioxide, and nitrogen oxide absorbed in said absorbent solvent composition does not exceed the molar concentration of water present in the absorbent solvent composition;

2. absorbing sulfur dioxide and sulfur trioxide and nitrogen oxide in said solvent composition;

3. passing the absorbent solvent composition containing absorbed sulfur dioxide, sulfur trioxide, and nitrogen oxide at a maximum temperature of about 115°C. to at least one stripping tower and stripping absorbed sulfur dioxide, nitrogen oxide, and water vapor from the absorbent solvent composition while maintaining the temperature in the stripper such that the temperature of the stripped solvent bottoms emerging from the stripper does not exceed about 125°C.;

4. removing from the stripper stripped lean solvent bottoms containing a maximum of about 20% by weight of sulfur dioxide, sulfur trioxide, and nitrogen oxide and at least about 1 mol of water for each mol of sulfur dioxide, sulfur trioxide, and nitrogen oxide absorbed in said lean absorbent solvent;

5. recycling one part of the stripped lean solvent bottoms from step (4) to the absorber together with sufficient water to provide an absorbent solvent composition having the same composition as that of step (1);

6. removing a second part of the stripped lean solvent bottoms from step (4);

7. separating sulfur trioxide from the second part of stripped lean solvent bottoms; and 8. recycling said stripped lean solvent bottoms resulting from step (7) to the absorber in step (1).

5. Process claimed in claim 1 wherein the nitrogen-containing compound is triethanolamine.

6. Process claimed in claim 2 wherein the nitrogen-containing compound is triethanolmine.

7. Process claimed in claim 3 wherein the nitrogen-containing compound is triethanolamine.

8. Process claimed in claim 4 wherein the nitrogen-containing compound is triethanolamine.

9. Process claimed in claim 1 wherein the gas mixture contains a preponderance of carbon dioxide.

10. Process claimed in claim 2 wherein the gas mixture contains a preponderance of carbon dioxide.

11. Process claimed in claim 3 wherein the gas mixture contains a preponderance of carbon dioxide.

12. Process claimed in claim 4 wherein the gas mixture contains a preponderance of carbon dioxide.

* * * * *

UNITED STATES PATENT OFFICE
CERTIFICATE OF CORRECTION

Patent No. 3,904,735     Dated September 9, 1975

Inventor(s) Gilbert R. Atwood et al.

It is certified that error appears in the above-identified patent and that said Letters Patent are hereby corrected as shown below:

Column 2, lines 30-38, for partially illegible Formula I, read

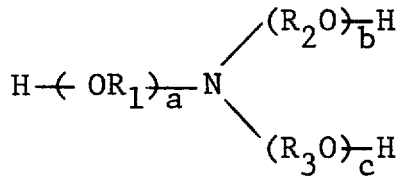

Column 6, line 17, the word before "stream" should read -- for --. Column 7, lines 65-68, the first formula, in the first line thereof, for the partially illegible letter immediately before the parenthesis mark ")", read -- O --; in both formulas, the second line of each, for the partially illegible parenthesis mark after "O", read -- ) --. Column 8, line 50, delete the second occurrence of "use". Column 9, lines 5-12, for the partially illegible portion of Formula III to the left of "N", read $$H(OR_1)_a\text{---}$$

and for the partially illegible subscript after the second large bracket, read -- 2 --. Column 9, line 17, for "formuls" read -- formula --; last line, after "water," for "a" read -- at --.

Signed and Sealed this

Seventh Day of September 1976

[SEAL]

Attest:

RUTH C. MASON
*Attesting Officer*

C. MARSHALL DANN
*Commissioner of Patents and Trademarks*